US011365793B2

(12) United States Patent
Nelson

(10) Patent No.: US 11,365,793 B2
(45) Date of Patent: Jun. 21, 2022

(54) HYBRID MODULE INCLUDING TORQUE CONVERTER INSIDE OF E-MOTOR AND HAVING REMOTE COMPENSATION CHAMBER

(71) Applicant: Schaeffler Technologies AG & Co. KG, Herzogenaurach (DE)

(72) Inventor: Kyle Nelson, Dover, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 16/871,702

(22) Filed: May 11, 2020

(65) Prior Publication Data

US 2021/0348674 A1 Nov. 11, 2021

(51) Int. Cl.
*F16H 45/02* (2006.01)
*H02K 7/10* (2006.01)
(Continued)

(52) U.S. Cl.
CPC ............. *F16H 45/02* (2013.01); *B60K 6/387* (2013.01); *F16H 41/24* (2013.01); *H02K 7/10* (2013.01);
(Continued)

(58) Field of Classification Search
CPC .... F16H 45/02; F16H 41/24; F16H 2041/243; F16H 2045/0205; H02K 7/10; B60K 6/387
See application file for complete search history.

(56) References Cited

U.S. PATENT DOCUMENTS

| 4,938,330 A | * | 7/1990 | Wallentowitz | F16D 35/005 |
| | | | | 192/106 F |
| 7,954,615 B2 | * | 6/2011 | Tiesler | F16D 25/0638 |
| | | | | 192/48.619 |

(Continued)

FOREIGN PATENT DOCUMENTS

| CN | 102588464 A | 7/2012 | |
| DE | 10342897 A1 * | 4/2005 | ......... F16D 25/0638 |
| KR | 1020090020791 A | 2/2009 | |

OTHER PUBLICATIONS

Search Report and Written Opinion for PCT/US2021/030545.

*Primary Examiner* — Richard W Ridley
*Assistant Examiner* — Aimee Tran Nguyen
(74) *Attorney, Agent, or Firm* — Davidson, Davidson & Kappel, LLC

(57) ABSTRACT

A hybrid module configured for arrangement in a torque path upstream from a transmission and downstream from an internal combustion engine includes an electric motor including a rotor and a stator for driving the rotor, a torque converter downstream of the electric motor, and a rotor input clutch including a piston and at least one clutch plate. The piston is configured for being pressed in a first axial direction into the at least one clutch plate via a pressure increase of fluid in an apply chamber. The hybrid module also includes a compensation chamber assembly. The compensation chamber assembly and the piston define a compensation chamber radially offset from the apply chamber. The compensation chamber assembly is configured for applying a force on the piston in a second axial direction opposite the first axial direction via a pressure increase of fluid in the compensation chamber.

20 Claims, 2 Drawing Sheets

(51) Int. Cl.
*F16H 41/24* (2006.01)
*B60K 6/387* (2007.10)

(52) U.S. Cl.
CPC ............. *F16H 2041/243* (2013.01); *F16H 2045/0205* (2013.01)

(56) References Cited

U.S. PATENT DOCUMENTS

| | | | |
|---|---|---|---|
| 8,967,352 B2* | 3/2015 | Kummer | F16D 21/06 192/85.25 |
| 2007/0017767 A1* | 1/2007 | Breier | F16F 15/12373 192/3.51 |
| 2007/0175723 A1* | 8/2007 | Blessing | F16D 25/0638 192/48.8 |
| 2009/0054190 A1 | 2/2009 | Kim et al. | |
| 2012/0175212 A1* | 7/2012 | Hart | B60K 6/387 192/48.601 |
| 2019/0283565 A1* | 9/2019 | Nelson | B60K 6/405 |
| 2020/0039496 A1 | 2/2020 | Lindemann et al. | |
| 2020/0040974 A1 | 2/2020 | Payne et al. | |
| 2020/0040976 A1 | 2/2020 | Steiner et al. | |
| 2020/0094668 A1 | 3/2020 | Podschwadt et al. | |
| 2020/0149620 A1* | 5/2020 | Jeyabalan | F16D 25/0635 |
| 2021/0270353 A1* | 9/2021 | Blischak | F16H 45/02 |

* cited by examiner

HYBRID MODULE INCLUDING TORQUE CONVERTER INSIDE OF E-MOTOR AND HAVING REMOTE COMPENSATION CHAMBER

The present disclosure relates generally to hybrid modules and more specifically to hybrid modules including a torque converter inside of an electric motor.

BACKGROUND

Hybrid modules includes an electric motor and a torque converter are known.

SUMMARY OF THE INVENTION

A hybrid module configured for arrangement in a torque path upstream from a transmission and downstream from an internal combustion engine includes an electric motor including a rotor and a stator for driving the rotor, a torque converter downstream of the electric motor, and a rotor input clutch selectively engageable and disengageable to drivingly connect the rotor to or disconnect the rotor from an output of an engine crankshaft. The rotor input clutch includes a piston and at least one clutch plate. The piston is configured for being pressed in a first axial direction into the at least one clutch plate to engage the rotor input clutch via a pressure increase of fluid in an apply chamber. The hybrid module also includes a compensation chamber assembly. The compensation chamber assembly and the piston define a compensation chamber radially offset from the apply chamber. The compensation chamber assembly is configured for applying a force on the piston in a second axial direction opposite the first axial direction via a pressure increase of fluid in the compensation chamber.

In embodiments of the hybrid module, the compensation chamber assembly may define a reservoir radially inside of the compensation chamber for pressurizing fluid to the compensation chamber via rotation of the compensation chamber assembly and the piston. The compensation chamber assembly may include a first compensation part radially outside of where the piston is configured for contacting the at least one clutch plate. The first compensation part may be sealed with respect to the piston by at least one seal to define the compensation chamber. The piston may be axially slidable with respect to the first compensation part along the at least one seal. The first compensation part may include a radially inner narrower section and a radially outer wider section. An inner circumferential surface of the radially outer wider section and a radially extending surface of the radially inner narrower section may define the compensation chamber with the piston. The compensation chamber assembly may include a second compensation part defining a reservoir radially inside of the compensation chamber for pressurizing fluid to the compensation chamber via rotation of the compensation chamber assembly and the piston. The apply chamber may be formed by the second compensation part and the piston. The second compensation part may include a first plate section and a second plate section. The reservoir may be defined axially between the first plate section and the second plate section. The second compensation part may include a passage passing therethrough radially outward from the reservoir configured to supply fluid from the reservoir to the compensation chamber via a passage in the piston. The second compensation part may include a passage passing therethrough for supplying fluid to the apply chamber. The hybrid module may further include a rotor carrier non-rotatably fixed to the rotor and a rotor flange non-rotatably fixed to and extending radially inward from the rotor carrier. The piston may be configured for pressing the least one clutch plate into the rotor flange to engage the rotor input clutch. The torque converter may be radially inside of the rotor. The hybrid module may further include a rotor output clutch selectively engageable and disengageable such that the rotor drivingly transfers torque to a turbine hub via fluid flow of the torque converter when the rotor output clutch is disengagement and bypasses the fluid flow of the of torque converter when the rotor output clutch is engaged.

A method of constructing a hybrid module configured for arrangement in a torque path upstream from a transmission and downstream from an internal combustion engine includes providing an electric motor including a rotor and a stator for driving the rotor; providing a torque converter downstream of the electric motor; and drivingly coupling an output of a rotor input clutch to the rotor. The rotor input clutch is selectively engageable and disengageable to drivingly connect the rotor to or disconnect the rotor from an output of an engine crankshaft. The rotor input clutch includes a piston and at least one clutch plate. The piston is configured for being pressed in a first axial direction into the at least one clutch plate to engage the rotor input clutch via a pressure increase of fluid in an apply chamber. The method also includes providing a compensation chamber assembly on the piston such that the compensation chamber assembly and the piston define a compensation chamber radially offset from the apply chamber. The compensation chamber assembly is configured for applying a force on the piston in a second axial direction opposite the first axial direction via a pressure increase of fluid in the compensation chamber.

In embodiments of the method, the torque converter may radially inside of the rotor. The method may further include providing a rotor output clutch selectively engageable and disengageable such that the rotor drivingly transfers torque to a turbine hub via fluid flow of the torque converter when the rotor output clutch is disengagement and bypasses the fluid flow of the of torque converter when the rotor output clutch is engaged. The compensation chamber assembly may include a first compensation part radially outside of where the piston is configured for contacting the at least one clutch plate and a second compensation part defining a reservoir radially inside of the compensation chamber for pressurizing fluid to the compensation chamber via rotation of the compensation chamber assembly and the piston. The apply chamber may be formed by the second compensation part and the piston.

BRIEF DESCRIPTION OF THE DRAWINGS

The present disclosure is described below by reference to the following drawings, in which.

DETAILED DESCRIPTION

The present disclosure provides a hybrid module including a torque converter inside of an electric motor. The hybrid module includes a compensation chamber disposed radially outside of a piston of a clutch for connecting a rotor of the electric motor to an output of an internal combustion engine.

A rotating reservoir chamber creates a head pressure that acts on a compensation chamber. A diameter of a reservoir inlet is calculated to provide a necessary compensation force. Oil from an apply circuit for engaging the clutch is supplied, for example by spraying, into the reservoir chamber.

Figure 1:
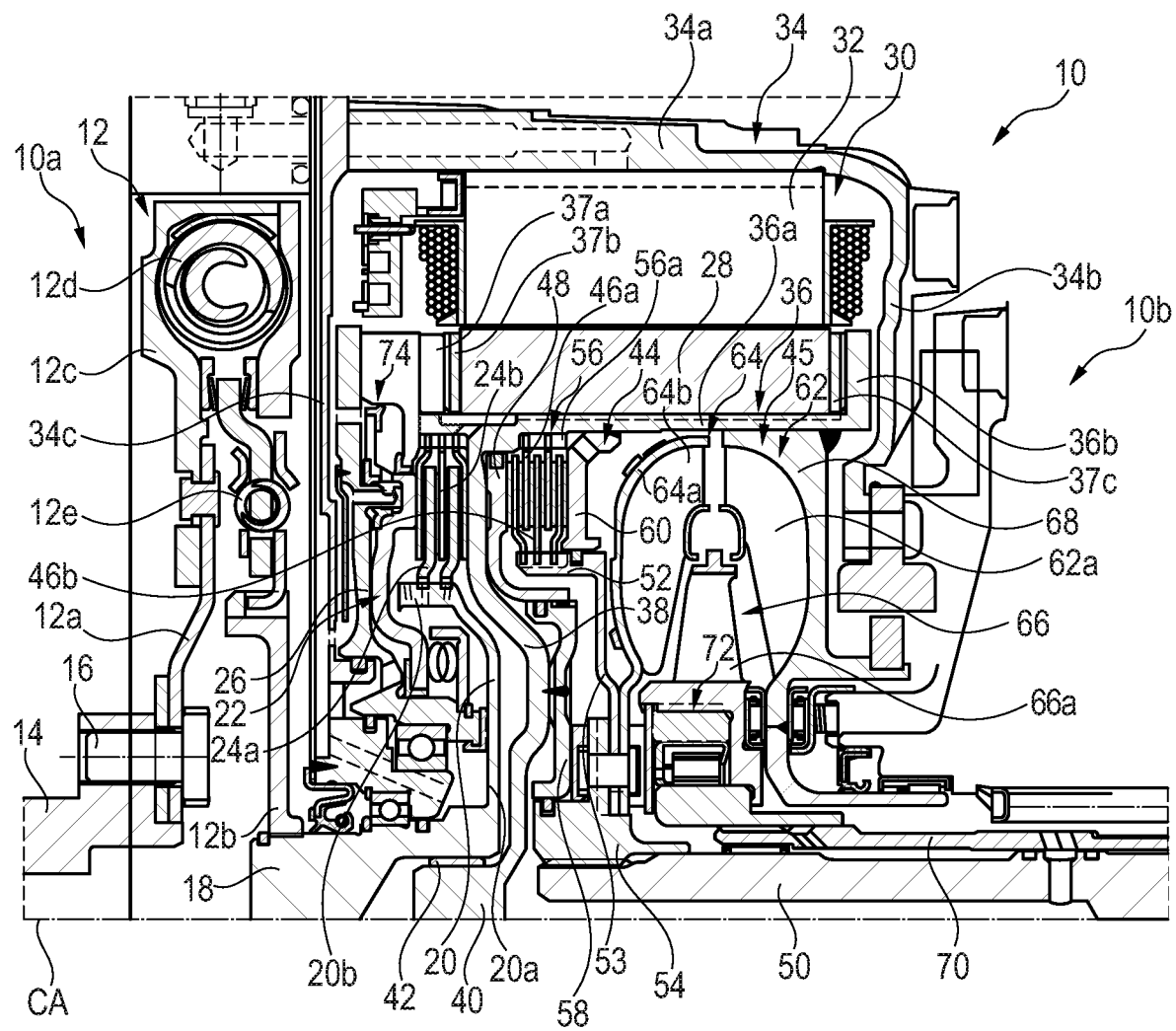
FIG. 1 shows a hybrid module in accordance with an embodiment of the present disclosure.

FIG. 1 shows a radial cross-sectional view of a hybrid module 10 in accordance with an embodiment of the present invention. Module 10 includes a first side 10a configured for attachment to an internal combustion engine and a second side 10b configured for attachment to a transmission input shaft. Module 10 includes a flywheel assembly 12 having an input section 12a configured for connecting to the crankshaft 14 of the internal combustion engine via bolts 16 and an output section 12b configured for connecting to a drive hub 18. Flywheel assembly 12 includes a flywheel 12c fixed to input section 12a and two spring sets—a radially outer spring set 12d and a radially inner spring set 12e—driven by flywheel 12c. Torque is transmitted from flywheel 12c to outer spring set 12d and then to inner spring set 12e, and then to output section 12b. An inner circumferential surface of output section 12b is non-rotatably fixed to an outer circumferential surface of drive hub 18.

Drive hub 18 extends axially away from flywheel assembly 12 to join an input part 20 of a rotor input clutch 22. Input part 20 may be formed as a single piece with drive hub 18 and has a cup-shape defined by a radially extending plate section 20a extending from drive hub 18 and an annular rim section 20b extending axially from a radially outer edge of section 20a toward flywheel assembly 12. In other embodiments, input part 20 may be manufactured as two pieces in many cases, and non-rotatably fastened with a weld or spline/snap-ring/staked connection. Annular rim section 20b defines an inner clutch plate carrier of clutch 22. Rotor input clutch 22 includes at least one input plate 24a, at least one output plate 24b and a piston 26 for forcing plates 24a, 24b axially together into frictional engagement to transfer torque from crankshaft 14 to a rotor 28 of an electric motor 30 via flywheel assembly 12 and drive hub 18. Rotor input clutch 22 is arranged and configured for drivingly connecting rotor 28 to the internal combustion engine.

Electric motor 30 includes a stator 32 surrounding rotor 28, with stator 32 being non-rotatably fixed to a housing 34 of hybrid module 10. Upon current being provided to coils of stator 32, rotor 28 is rotated about a center axis CA of hybrid module 10, due to rotor 28 including a plurality of annular rotor segments that each include a plurality of circumferentially space magnets which in at least some preferred embodiments are permanent magnets, that are energized by the current in the coils of stator 32. The terms axially, radially and circumferentially as used herein are used with respect to center axis CA. In some embodiments, electric motor 30 is a generator or can function as a motor or a generator. Rotor 28 is non-rotatably fixed at its inner circumferential surface to a cylindrical section 36a of a rotor carrier 36 such that rotor 28 and rotor carrier 36 rotate together about center axis CA.

Electric motor 30 further includes a rotor clamping ring 37a fixed to cylindrical section 36a for axially retaining rotor 24 on rotor carrier hub 28. Rotor clamping ring 37a is provided at a first axial end of rotor carrier 36 that is opposite to a second axial of rotor carrier 36 including a radially extending disc section 36b, such that the magnet segments of rotor 28 are clamped axially between section 36b and ring 37a. A first non-ferrous plate 37b is provided axially between rotor 28 and ring 37a and a second non-ferrous plate 37c is provided axially between rotor 28 and section 36b. Plates 37b, 37c may be formed of aluminum and contact the rotor magnets to block eddy currents, which are essentially short circuits of the magnetic flux field and lead to low e-motor efficiency.

A rotor flange 38 is non-rotatably fixed to rotor carrier 36 and extends radially inward from cylindrical section 36a. A rotor hub 40, through which center axis CA passes, is non-rotatably fixed to an inner radial end of rotor flange 38 such that rotor flange 38 is directly connected to rotor carrier 36 and rotor hub 40. In the embodiment in FIG. 1, rotor carrier 36, rotor flange 38 and rotor hub 40 are formed together as a single piece. Rotor hub 40 is received in a blind hole in drive hub 18, with rotor hub 40 being centered in drive hub 18 by a bushing 42. Bushing 42 contacts an inner circumferential surface of drive hub 18 at the blind hole and an outer circumferential surface of rotor hub 40 such that rotor hub 40 is rotatable with respect to drive hub 18.

Module 10 further includes a rotor output clutch 44 that forms a lockup clutch of a hydraulic torque converter 45 provided radially inside of rotor 28. Rotor output clutch 44 includes at least one input plate 46a, at least one output plate 46b and a piston 48 for forcing plates 46a, 46b axially together into frictional engagement to transfer torque from rotor 28 to a transmission input shaft 50 of a planetary transmission via an inner clutch plate carrier 52, a torque output plate 53 and a turbine hub 54. Rotor output clutch 44 is arranged in parallel with the hydraulic torque converter 45 for drivingly connecting rotor 28 to transmission input shaft 50.

Rotor carrier 36 includes teeth or splines 56a on the inner circumference thereof and forms an outer clutch plate carrier 56 upon which clutch output plates 46a are non-rotatably connected and axially slidable. Inner clutch plate carrier 52 includes teeth or splines on the outer circumference thereof upon which clutch output plates 46b are non-rotatably connected and axially slidable. A radially outer end of piston 48 is sealingly axially slidable along the inner circumferential surface of rotor carrier 36 and a radially inner axially extending portion of piston 48 is axially slidable along a support plate 58, which is non-rotatably fixed to rotor flange 38, for example via laser welding. Piston 48 is axially slidable away from rotor range 38 to force clutch plates 46a, 46b into a clutch backing plate 60 to engage rotor output clutch 44, and thus bypass the torque converter 45. Piston 48 is also connected non-rotatably to support plate 58, for example via toothed connection at an inner diameter of piston 48 to an outer diameter of support plate 58. In other embodiments, support plate 58 can be omitted and piston 48 can directly engage turbine hub 54 and be connected to rotor flange 38 via leaf springs.

Torque converter 45 includes a hydraulic coupling arrangement formed by an impeller 62 and a turbine 64. A cover 68, which forms a shell of impeller 62 and delimits a transmission side of torque converter 45, is non-rotatably fixed to the inner circumferential surface of rotor carrier 38, which forms an engine side cover of torque converter 45, for example via a weld. Impeller 62 includes a plurality of impeller blades 62a fixed to cover 68. Turbine 64 includes a turbine shell 64a supporting a plurality of turbine blades 64b. Impeller 62, via torque input from rotor 28, drives turbine 64 via fluid flow from impeller blades 62a to turbine blades 64b, when the clutch 44 is disengaged, and turbine 64, via a non-rotatably connection to turbine hub 54, then drives transmission input shaft 50. Torque converter 45 also includes a stator 66 axially between turbine 64 and impeller 62 that includes a plurality of circumferentially spaced stator blades 66a to redirect fluid flowing from the turbine blades 64b before the fluid reaches impeller blades 62a to increase the efficiency of torque converter 45. Stator 66 is fixed on a non-rotatable shaft 70 by a one-way clutch 72.

Housing 34 encloses electric motor 30, torque converter 45 and clutches 22, 44. Housing 34 includes a cylindrical outer shell section 34a fixed to and radially surrounding stator 32, a transmission side plate section 34b axially facing motor 30 and a portion of cover 68 and extending radially inward from a transmission side end of section 34a, and an engine side plate section 34c provided between clutch 22 and flywheel assembly 12 and extending radially inward from an engine side end of section 34a. Housing 34 also includes a rim section 34d radially surrounding flywheel assembly 12 and protruding axially from the transmission side of section 34c.

Hybrid module 10 further includes a compensation chamber assembly 74 axially between clutch 22 and engine side plate section 34b.

Figure 2:
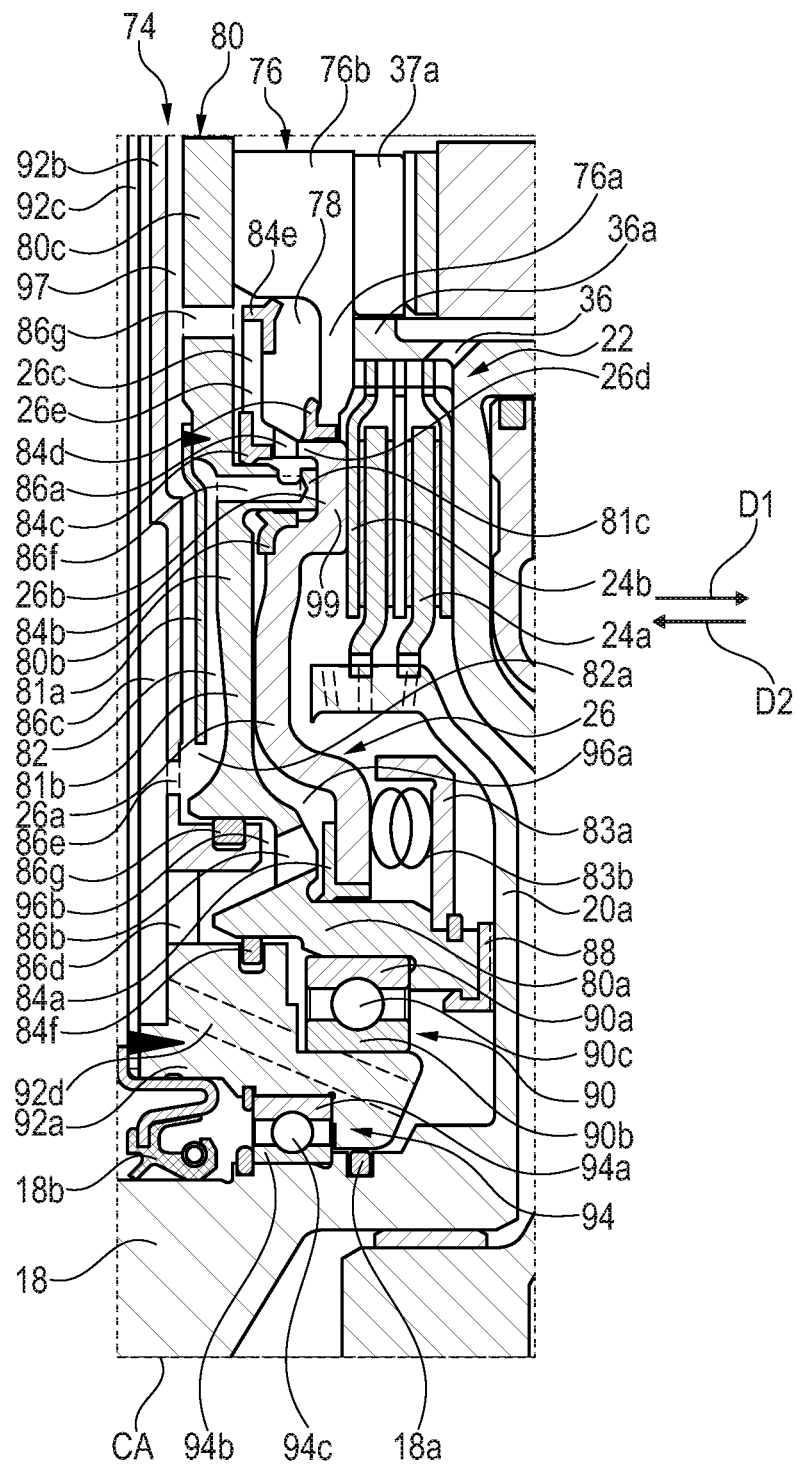
FIG. 2 shows an enlarged view of a portion of the hybrid module shown in FIG. 1 illustrating a remote compensation chamber.

FIG. 2 shows an enlarged view of a portion of the hybrid module 10 shown in FIG. 1 illustrating compensation chamber assembly 74. Compensation chamber assembly 74 includes a first compensation part 76 for defining a balance chamber 78 with piston 26 and a second compensation part 80 for defining a rotating reservoir 82.

Piston 26 includes a radially inner portion 26a, an intermediate portion 26b radially outside of inner portion 26a and a radially outer portion 26c radially outside of intermediate portion 26b. Inner portion 26a is elastically connected to a support plate 83a by a spring 83b and includes a radially inner end that contacts a first seal 84a and a radially outer end that contacts a second seal 84b. Intermediate portion 26b includes a first radially extending surface for contacting one of clutch plates 24b and an opposite second radially extending surface for contacting second compensation part 80. Radially outer portion 26c includes an inner axially extending section 26d defining a radially inner boundary of balance chamber 78 and an outer radially extending section 26e defining an engine side axial boundary of balance chamber 78. Inner axially extending section 26d includes a radially extending passage 86a providing fluid radially outward to balance chamber 78. An inner circumferential surface of inner axially extending section 26d contacts a third seal 84c, while an outer circumferential surface of inner axially extending section 26d contacts a fourth seal 84e. An outer circumferential surface of outer radially extending section 26e contacts a fifth seal 84e.

First compensation part 76 axially abuts rotor clamping ring 37a and an axial end of cylindrical section 36a of rotor carrier 36 and sealingly abuts piston 26 at two different locations—via seal 84d and seal 84e. First compensation part 76 is non-rotatably fixed to rotor carrier 36 for example via a weld or bolts and part 80 is fixed to part 76, and thus to rotor carrier 36, via a weld or bolts. First compensation part 76 includes a stepped inner circumferential surface defined by a radially inner narrower section 76a and a radially outer wider section 76b. A radially extending surface of radially inner narrower section 76a and the inner circumferential surface of radially outer wider section 76b delimit part of chamber 78.

Second compensation part 80 includes a radially inner portion 80a forming an axially extending hub of part 80, an intermediate portion 80b extending radially outward from portion 80a and a radially outer portion 80c extending radially outward from portion 80b. Radially inner portion 80a axially abuts radially extending plate section 20a of input part 20 via thrust washer 88 and radially and axially contacts an outer race 90a of a bearing 90 whose inner race 90b, which is rotatable with respect to outer race 90a via rolling members 90c, is radially supported on a radially inner hub portion 92a of housing section 34c. Hub portion 92a is rotatably supported on an outer circumferential surface of drive hub 18 via an outer race 94a of a bearing 94, whose inner race 94b, which is rotatable with respect to outer race 94a via rolling members 94c, is radially supported on the outer circumferential surface of drive hub 18. Hub portion 92a is sealed with respect to drive hub 18 by seals 18a, 18b. The inner circumferential surface of radially inner portion 80a is sealed with respect to the outer circumferential surface of hub portion 92a via a seal 84f.

Intermediate portion 80b includes a passage 86b passing therethrough for providing fluid to an apply chamber 96a for forcing piston 26 to axially press plates 24a, 24b against rotor flange 38, which forms a clutch backing for clutch 22. Radially outside of seal 84f, intermediate portion 80b is sealed with respect to a protrusion on housing section 34c by a seal 84g. Housing section 34c includes a radially extending passage 86c therein for supplying fluid to apply chamber 96a via an axially extending passage 86d in housing section 34c, through a space 96b defined between seals 84f, 84g and then through passage 86b. When apply chamber 96a becomes sufficiently pressurized, piston 26 is forced in an axial direction D1 to engage clutch 22. Housing section 34b is formed by two axially offset wall sections 92b, 92c that define radially extending passage 86c therebetween. Hub portion 92a also includes a passage 92d formed therein for supplying fluid from 86c for a splash cooling of clutch 22, with the coolant exiting clutch 22 via outlet bore 36c formed in rotor carrier 36. Radially outside of seal 84g, intermediate section 80b defines rotating reservoir 82 for supplying fluid from radially extending passage 86c to balance chamber 78. Intermediate portion 80b is split into two plate sections 81a, 81b that define rotating reservoir 82, with plate section 81b being formed by a main portion of part 80 and plate section 81a being formed by an auxiliary plate fixed to the main portion, for example via laser welding. Wall section 92b is provided with a supply port 86e for providing fluid from passage 86c to reservoir 82 through an inlet 82a of reservoir 82, which is formed by the inner diameter of plate section 81a and intermediate portion 80b. Radially outside of plate section 81b, intermediate portion 80b includes an axially protruding section 81c protruding from plate section 81b. Protruding section 81c is provided with a passage 86f for providing fluid radially outward from rotating reservoir 82 to chamber 78 via passage 86a in piston 26.

Outer portion 80c is provided with a drain hole 86g passing axially therethrough for preventing a pressure buildup in chamber 78 due to leakage from seals 84c, 84e. Outer portion 80c is held axially into contact with radially outer wider section 76b of part 76. Outer portion 80c and plate section 81a are axially spaced from wall section 92b to provide a space 97, with into which hole 86g opens.

During operation of hybrid module, compensation chamber 78 fills up with fluid to apply force in an axial direction D2, which is opposite clutch apply direction D1, to cancel out the rotational dynamic pressure effects on the clutch 22. Compensation chamber 78 is advantageously radially offset from apply chamber 96a and radially offset from the clutch contact location 99, where piston 26 contacts one of the clutch plates 24b, by being radially outside of location 99 and apply chamber. In contrast with a design where the compensation chamber is axially stacked with apply chamber 96a and radially overlaps with or is radially aligned with apply chamber 96a—i.e., where a line extending parallel to center axis CA can be drawn through the compensation chamber and the apply chamber, the radial offset of chamber 78 with respect to apply chamber 96a saves axial space.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
D1, D2 axial directions
10 hybrid module
10a front side
10b rear side
12 flywheel assembly
12a input section
12b output section
12c flywheel
12d radially outer spring set
12e radially inner spring set
14 crankshaft
16 bolts
18 drive hub
20 input part
20a radially extending plate section
20b annular rim section
22 rotor input clutch
24a clutch input plates
24b clutch output plates
26 piston
26a radially inner portion
26b intermediate portion
26c radially outer portion
26d inner axially extending section of radially outer portion
26e outer radially extending section of radially outer portion
28 rotor
30 electric motor
32 stator
34 housing
34a cylindrical outer shell section
34b transmission side plate section
34c engine side plate section
34d rim section
36 rotor carrier
36a cylindrical section
36b radially extending disc section
37a rotor clamping ring
37b, 37c non-ferrous plates
38 rotor flange
40 rotor hub
42 bushing
44 rotor output clutch
45 hydraulic torque converter
46a clutch input plates
46b clutch output plates
48 piston
50 transmission input shaft
52 inner clutch plate carrier
53 torque output plate
54 turbine hub
56 outer clutch plate carrier
56a teeth or splines
58 support plate
60 clutch backing plate
62 impeller
62a impeller blades
64 turbine
64a turbine shell
64b turbine blades
66 stator
68 cover
70 non-rotatable shaft
72 one-way clutch
74 compensation chamber assembly
76 first compensation part
76a radially inner narrower section
76b radially outer wider section
78 balance chamber
80 second compensation part
80a radially inner portion
80b intermediate portion
80c radially outer portion
81a, 81b plate sections
82 rotating reservoir
83a support plate
83b spring
84a first seal
84b second seal
84c third seal
84d fourth seal
84e fifth seal
84f sixth seal
84g seventh seal
86a radially extending passage
86b passage
86c radially extending passage
88 thrust washer
90 bearing
90a outer race
90b inner race
90c rolling members
92a radially inner hub portion
92b, 92c wall sections
92d passage
94 bearing
94a outer race
94b inner race
94c rolling members
96a apply chamber
96b space
97 space
99 location

What is claimed is:

1. A hybrid module configured for arrangement in a torque path upstream from a transmission and downstream from an internal combustion engine, the hybrid module comprising:
an electric motor including a rotor and a stator for driving the rotor;
a torque converter downstream of the electric motor;
a rotor input clutch selectively engageable and disengageable to drivingly connect the rotor to or disconnect the rotor from an output of an engine crankshaft, the rotor input clutch including a piston and at least one clutch plate, the piston configured for being pressed in a first axial direction into the at least one clutch plate to engage the rotor input clutch via a pressure increase of fluid in an apply chamber; and
a compensation chamber assembly, the compensation chamber assembly and the piston defining a compensation chamber positioned entirely radially outward from the apply chamber and radially outward from a portion of the piston configured for contacting the at least one clutch plate, the compensation chamber assembly configured for applying a force on the piston in a second axial direction opposite the first axial direction via a pressure increase of fluid in the compensation chamber.

2. The hybrid module as recited in claim 1 wherein the compensation chamber assembly defines a reservoir radially inside of the compensation chamber for pressurizing fluid to the compensation chamber via rotation of the compensation chamber assembly and the piston.

3. The hybrid module as recited in claim 1 wherein the compensation chamber assembly includes a first compensation part radially outside of where the piston is configured for contacting the at least one clutch plate.

4. The hybrid module as recited in claim 3 wherein the first compensation part is sealed with respect to the piston by at least one seal to define the compensation chamber, the piston being axially slidable with respect to the first compensation part along the at least one seal.

5. The hybrid module as recited in claim 3 wherein the first compensation part including a radially inner narrower section and a radially outer wider section, an inner circumferential surface of the radially outer wider section and a radially extending surface of the radially inner narrower section defining the compensation chamber with the piston.

6. The hybrid module as recited in claim 1 wherein the compensation chamber assembly includes a second compensation part defining a reservoir radially inside of the compensation chamber for pressurizing fluid to the compensation chamber via rotation of the compensation chamber assembly and the piston, the apply chamber being formed by the second compensation part and the piston.

7. The hybrid module as recited in claim 6 wherein the second compensation part includes a first plate section and a second plate section, the reservoir being defined axially between the first plate section and the second plate section.

8. The hybrid module as recited in claim 6 wherein the second compensation part includes a passage passing therethrough radially outward from the reservoir configured to supply fluid from the reservoir to the compensation chamber via a passage in the piston.

9. The hybrid module as recited in claim 6 wherein the second compensation part includes a passage passing therethrough for supplying fluid to the apply chamber.

10. The hybrid module as recited in claim 1 further comprising a rotor carrier non-rotatably fixed to the rotor and a rotor flange non-rotatably fixed to and extending radially inward from the rotor carrier, the piston configured for pressing the least one clutch plate into the rotor flange to engage the rotor input clutch.

11. The hybrid module as recited in claim 1 wherein the torque converter is radially inside of the rotor.

12. The hybrid module as recited in claim 11 further comprising a rotor output clutch selectively engageable and disengageable such that the rotor drivingly transfers torque to a turbine hub via fluid flow of the torque converter when the rotor output clutch is disengaged and bypasses the fluid flow of the torque converter when the rotor output clutch is engaged.

13. The hybrid module as recited in claim 1 wherein the piston is configured such that fluid flows through the piston and into the compensation chamber.

14. The hybrid module as recited in claim 1 wherein the compensation chamber assembly includes a first compensation part and a second compensation part defining the compensation chamber, the second compensation part and the piston being configured such that fluid flows through the second compensation part and then through the piston and into the compensation chamber.

15. A method of constructing a hybrid module configured for arrangement in a torque path upstream from a transmission and downstream from an internal combustion engine, the method comprising:
providing an electric motor including a rotor and a stator for driving the rotor;
providing a torque converter downstream of the electric motor;
drivingly coupling an output of a rotor input clutch to the rotor, the rotor input clutch being selectively engageable and disengageable to drivingly connect the rotor to or disconnect the rotor from an output of an engine crankshaft, the rotor input clutch including a piston and at least one clutch plate, the piston configured for being pressed in a first axial direction into the at least one clutch plate to engage the rotor input clutch via a pressure increase of fluid in an apply chamber; and
providing a compensation chamber assembly on the piston, the compensation chamber assembly and the piston defining a compensation chamber radially offset from the apply chamber, the compensation chamber assembly configured for applying a force on the piston in a second axial direction opposite the first axial direction via a pressure increase of fluid in the compensation chamber, a radially outer end of the piston being received in the compensation chamber.

16. The method as recited in claim 15 wherein the torque converter is radially inside of the rotor, the method further comprising providing a rotor output clutch selectively engageable and disengageable such that the rotor drivingly transfers torque to a turbine hub via fluid flow of the torque converter when the rotor output clutch is disengaged and bypasses the fluid flow of the torque converter when the rotor output clutch is engaged.

17. The method as recited in claim 16 wherein the compensation chamber assembly includes a first compensation part radially outside of where the piston is configured for contacting the at least one clutch plate and a second compensation part defining a reservoir radially inside of the compensation chamber for pressurizing fluid to the compensation chamber via rotation of the compensation chamber assembly and the piston, the apply chamber being formed by the second compensation part and the piston.

18. A hybrid module configured for arrangement in a torque path upstream from a transmission and downstream from an internal combustion engine, the hybrid module comprising:
an electric motor including a rotor and a stator for driving the rotor;
a torque converter downstream of the electric motor;
a rotor input clutch selectively engageable and disengageable to drivingly connect the rotor to or disconnect the rotor from an output of an engine crankshaft, the rotor input clutch including a piston and at least one clutch plate, the piston configured for being pressed in a first axial direction into the at least one clutch plate to engage the rotor input clutch via a pressure increase of fluid in an apply chamber; and
a compensation chamber assembly, the compensation chamber assembly and the piston defining a compensation chamber radially offset from and axially overlapping the apply chamber, the compensation chamber assembly configured for applying a force on the piston in a second axial direction opposite the first axial direction via a pressure increase of fluid in the compensation chamber, wherein the compensation chamber assembly includes a first compensation part radially outside of where the piston is configured for contacting the at least one clutch plate.

19. The hybrid module as recited in claim 14 wherein the first compensation part is sealed with respect to the piston by at least one seal to define the compensation chamber, the piston being axially slidable with respect to the first compensation part along the at least one seal.

20. The hybrid module as recited in claim 18 wherein the first compensation part including a radially inner narrower section and a radially outer wider section, an inner circumferential surface of the radially outer wider section and a radially extending surface of the radially inner narrower section defining the compensation chamber with the piston.

* * * * *